United States Patent Office 3,209,054
Patented Sept. 28, 1965

3,209,054
POLYADDUCT RESINS OF MONOMOLECULAR ESTERS AND DIALLYLIDENE PENTAERYTHRITOL STABILIZED WITH ALKALINE-REACTING COMPOUNDS
Alfred Englisch, Eltville, Rheingau, and Rolf Zimmermann, Wiesbaden-Biebrich, Germany, assignors to Chemische Werke Albert, Wiesbaden-Biebrich, Germany, a corporation of Germany
No Drawing. Filed Apr. 8, 1960, Ser. No. 20,825
Claims priority, application Germany, Apr. 11, 1959, C 18,776; Dec. 16, 1959, C 20,378
12 Claims. (Cl. 260—861)

This invention relates to a new type of synthetic resin polymers and their production. The chemical and physical characteristics of these new resins make them especially well adapted for the production of cast resins.

It is known that unsaturated acetals such, for instance, as obtained from glycol and acrolein can add on monovalent or multivalent alcohols whereby ether or polyether cycloacetals are formed. It is further know that on this basis, for instance, by the conversion of acrolein with polyfunctional alcohols, especially pentaerythritol, synthetic resins are formed in the presence of certain catalyzers. In this latter instance, as an intermediate stage, mono and diallylidene acetals develop which, with further still free OH— groups, form polyether cycloacetals. Similar compounds are obtained if preformed twice or thrice unsaturated acetals are converted with multivalent alcohols (H. Orth, Uber neuere Polyaddukte und ihre technischen Anwendungsmoglichkeiten, Kunststoffe 41, 454–457, 1951).

It has now been found that glass-like, colorless, or slightly colored, infusible resins with good chemical and physical characteristics are obtained when esters which have been obtained from an ethylenically unsaturated dicarboxylic acid and multivalent saturated alcohols and which still contain free alcoholic hydroxyl groups, are added to diallylidene pentaerythritol and the resulting polyadducts dissolved in polymerizable α-substituted ethylene compounds and copolymerized therewith in the presence of organic peroxide catalysts. For instance, styrene and esters of methacrylic acid have proven to be especially advantageously used as α-substituted polymerizable monomer compounds.

In the production of the esters of dicarboxylic acid containing at least one free and reactive alcoholic hydroxy group, saturated aliphatic polyhydric alcohols are preferably used in the esterification. These alcohols may be reacted with dicarboxylic acids in a known manner by reacting 1 mol of the dicarboxylic acid with one or two mols of the polyhydric alcohol.

A variety of polyhydric alcohols may be used to form the esters but among the suitable saturated aliphatic polyhydric alcohols the low molecular polyhydric alkanols and polyhydric alkanol ethers derived therefrom are preferred. Typically such compounds contain not more than 6–10 carbon atoms and include such polyhydric compounds as ethylene glycol, diethylene glycol, triethylene glycol, 1,2-propylene glycol, glycerine, trimethylol propane and the like.

Suitable ethylenically unsaturated dicarboxylic acids are preferably the α,β-unsaturated dicarboxylic acids, or the ethylene α,β-dicarboxylic acids. Among the more practicable the following are representative: maleic acid, fumaric acid, itaconic acid, citraconic acid and the like.

It will be seen that when the above noted polyhydric alcohols are reacted with the above noted α,β-unsaturated dicarboxylic acids in the stated molar proportions, the esters will always contain at least one free and reactive alcoholic hydroxy group.

In the formation of the polyadducts with the above noted esters of the α,β-unsaturated dicarboxylic acids, the esters may be used together with multivalent alcohols such as glycol, diethylene glycol, triethylene glycol, trimethylol propane or with polynuclear diphenols, preferably p,p′-dihydroxydiphenylpropane or its dihydroxyethyl ether. Normally these polyhydric compounds are used in a minor proportion relative to the weight of the ester containing the free alcoholic hydroxyl group.

The formation of polyadducts hereof may be activated by the presence of catalytic amounts of inorganic or organic acids. Suitable acids, for instance, include phosphoric acid, sulfuric acid, p-toluol sulfonic acid, glacial acetic acid, halogenacetic acid, or so-called Lewis acids such as aluminum chloride, tin tetrachloride, boron trifluoride and especially boron trifluoride etherate and the like. Usually reaction will take place by merely mixing the reactants with the catalysts at room temperatures and temperatures between 20–110° C. are customarily used. Temperatures of 50–70° C. are preferred.

The character of the resins produced is dependent upon the type and concentration of the catalysts as well as upon the temperature used and time of the reaction. Valuable polyadducts have been obtained when using from 0.5 to 2 mols of ester per mol of diallylidene pentaerythritol.

The polyadducts obtained in the first phase of the reaction are capable of further reaction with polymerizable α-substituted ethylene compounds to form copolymers which have properties rendering them especially useful for the formation of laminations and cast resins and for use as adhesives. Suitable polymerizable α-substituted ethylene compounds include for instance vinyl compounds such as vinyl toluol, vinyl pyrrolidone, vinyl acetate, diallyl maleate, diallyl phthalate, acrylic acid ester, acrylonitrile or the like, preferably styrene or the vinylidene compounds such as methacrylic acid esters such as methyl methacrylate. In general, normally liquid polymerizable vinyl and vinylidene monomers are preferred. By using these liquid monomers, solutions or liquid dispersions of the polyadduct resin can be formed which are especially well adapted for use in the above noted applications.

The quantity of the ethylene monomer used can be varied in accordance with the intended use; 30 to 50% based on the weight of the resin solution have been found to constitute a favorable proportion. Putting it another way, the weight ratio of the polyadduct to the polymerizable α-substituted ethylene compound has been found to be quite satisfactory between about 2.3:1 and 1:1. Of course, the amount of α-substituted ethylene compound needed will be dependent upon the phase that the adduct has reached at the time of its dispersion in the polymerizable α-substituted compound. In the beginning of the reaction between the ester and the diallylidene pentaerythritol, the miscibility of the adduct increases as the addition advances but the OH-number of the adduct should be preferably maintained less than 100 for if the addition progresses too far, the solubility, or miscibility, of the adduct with the polymerizable α-substituted ethylene compound begins to decline.

It has been found that the solution of the adducts hereof in suitable α-substituted ethylene compound is lacking in stability and stability is a very desirable property for the preferred fields of use. The addition of conventional stabilizers against gelling such as anti-oxidants of the type of hydroquinone or phenolic compounds have not, in many instances, been capable of preventing gelling. On the other hand, it has surprisingly been found that the addition of basic substances preferably in amounts approximately equal to the amount of acid catalyzer used will very effectively stabilize the solution. The composition containing appropriate amounts of the basic substances remain stable for many months and in many instances no changes are noticeable after six months. In the absence of these basic reacting stabilizers, frequently the polyadducts dissolved in styrene, for instance, will gel in two to four hours. The presence of these basic substances does not reduce the effectiveness of known polymerization inhibitors such as substituted pyrocatechol, hydroquinone or the like. Surprisingly, and advantageously, these basic-reacting substances seem to have a brightening effect upon the formed resins and inhibit yellowing.

Suitable basic-reacting substances include, both organic and inorganic substances such as, for instance, alkali hydroxide, alkali alcoholate, organic bases such as piperidine, morpholine, ethylene diamine, pyrrolidine, or the like. As stated, they are preferably used in a quantity equivalent to the catalyzer used. In this way, the products of addition can be stabilized and can thus be made suitable for their further processing. Simultaneously with the stabilization, a brightening of color, as a rule, is brought about.

After the dispersion of the polyadducts resin in the polymerizable α-substituted ethylene has been stabilized, the copolymerization may be induced by organic peroxides such as have heretofore been found useful for the polymerization of the vinyl compound. Suitable peroxides include, for instance, benzoyl peroxide, cyclohexanone peroxide, methyl ethyl ketone peroxide, and cumol hydroperoxide and, as well, also tert. butylperbenzoate and the like. Also conventional accelerators may be used together with the organic peroxides such as dimethyl aniline, cobalt octoate, lauryl mercaptan or similar substances. The copolymerization may be carried out at room or mildly elevated temperatures.

Generally speaking, the products produced in accordance with this invention are either completely clear, clear as water, or slightly yellowish or brownish in color. They are especially useful for the production of cast resins but are also well-suited for lamination of glass and textile fibers. Additionally, they constitute excellent lacquer resins and may be used in the production of adhesives. Conventional inorganic fillers may be used in the production of molded resin products. Such fillers include asbestos, lime, chalk, ground glass and silicon carbide. Compatibility with the resin is good and organic dyestuffs or pigments may be added to impart desired esthetic characteristics. None of these additional agents disturb the copolymerization of the adducts with the polymerizable α-substituted ethylene monomer.

The resulting hardened resin products either as such or in the presence of fillers, extenders, coloring agents and the like have superior chemical stability particularly against the action of alkalis and acids.

An understanding of the invention will be facilitated by the following detailed and specific, but purely illustrative examples, in which all parts are expressed as parts by weight.

*Example 1*

Fifty-three (53) parts of diallylidene pentaerythritol were dissolved in 51 parts of maleic acid bis-(ethylene glycol) ester with 0.4 part of boron trifluoride etherate and heated for about five hours at 60° C. until the OH— number fell between 80 and 90. The slightly brown, clear resin was dissolved in 40 parts of styrene, mixed with 2 parts of a methyl ethyl ketone peroxide solution (40% in dimethylphthalate) and with 1 part of cobalt octoate solution (1% cobalt content) and left standing at room temperature.

The solution gelled within 50 minutes and solidified in 14 hours into a solid, water-clear mass. By an after-hardening at 80° C. for one hour, one obtains a hard, clear body.

*Example 2*

Forty-two (42) parts of diallylidene pentaerythritol, 61 parts maleic acid bis-(ethylene glycol) ester and 0.3 part p-toluol sulfonic acid were mixed together carefully and left standing for 2 days at room temperature. Three (3) parts of benzoyl peroxide (50% in phthalate softener) were dissolved in 50 parts of methacrylic acid methyl ester. The polyadduct resin was incorporated in this solution.

The resulting composition was cast in forms and then hardened for 5 hours at 70° C. A clear, slightly yellow-brown, hard-formed body was obtained.

*Example 3*

Forty-two (42) parts of diallylidene pentaerythritol and 26 parts of maleic acid bis-glycerol ester were stirred together. To the weakly turbid solution 0.35 part of boron trifluoride etherate was added and then the solution was heated for 8 hours to 60° C. Already, after a short heating, the turbidity disappeared and the mixture became gradually more viscous and slightly yellow. The resin thus obtained was dissolved in 35 parts of styrene, stirred with 3 parts cyclohexanone peroxide (50% in dimethylphthalate) and with 1 part of a cobalt octoate solution.

The resulting composition was cast in forms and polymerized at room temperature within 2 days in a clear, slightly yellow mass. By heating to 70° C. the time of hardening can be reduced to one hour.

*Example 4*

A mixture of 17 parts of maleic acid bis-trimethylol propane ester, 21 parts of diallylidene pentaerythritol and 0.4 part of boron trifluoride etherate was stirred for 5 hours at 55 to 60° C. The viscous, slightly yellow-brown resin was dissolved in 30 parts styrene and after addition of 2 parts methyl ethyl ketone peroxide solution (40% in dimethylphthalate) and 1 part cobalt octoate solution left standing at 25° C.

The mass solidified after 2 hours and within 6 days it had hardened into clear, colorless, hard bodies.

*Example 5*

Fourteen (14) parts of maleic acid bis-(ethylene glycol) ester, 4 parts maleic acid bis-glycerol ester, 21 parts of diallylidene pentaerythritol and 0.16 part of boron trifluoride etherate were mixed together and heated for 8 hours to 70° C. The slightly yellow-brown, clear resin was dissolved in 20 parts styrene.

After the addition of 2 parts methyl ethyl ketone peroxide and 1 part cobalt octoate solution, the composition hardened in 4 days into a clear, slightly yellow mass.

*Example 6*

Thirty-two (32) parts of diallylidene pentaerythritol were dissolved in 24 parts of maleic acid bis-(ethylene glycol) ester and 9 parts of maleic acid diethylene glycol ester, mixed with 0.26 part boron trifluoride etherate and stirred for 8 hours at 60° C. Three (3) parts methyl ethyl ketone peroxide solution were stirred into 40 parts of styrene and the polyadduct resin was dissolved therein.

After the addition of 1 part cobalt octoate solution, it was cast in forms. The mass gelled within 50 minutes and hardened in 4 days into clear, colorless formed bodies.

*Example 7*

Thirty-two (32) parts of diallylidene pentaerythritol, 14 parts of p,p'-dihydroxydiphenylpropane dihydroxyethyl ether and 22 parts of maleic acid bis-(ethylene glycol) ester were stirred together and 0.35 part boron trifluoride etherate was added. Upon heating to 60° C. a slightly brown clear solution was formed. The mixture was held for 3 hours at this temperature and then dissolved in 30 parts of styrene.

Upon the addition of 2 parts of a methyl ethyl ketone peroxide solution and 1 part cobalt octoate solution to the styrene solution, slightly brown, clear castings were obtained.

Example 8

Twenty-five (25) parts of maleic acid bis-(ethylene glycol) ester, 7 parts of p,p'-dihydroxydiphenylpropane, 32 parts of diallylidene pentaerythritol and 0.25 part boron trifluoride etherate were mixed thoroughly together and heated for 4 hours to 60° C. Already after a short heating, a complete solution took place. The slightly brown resin which developed was dissolved in 38 parts of styrene and 3 parts of a methyl ethyl ketone peroxide solution.

After addition of 1 part cobalt octoate solution, the composition was cast in molds and left standing at 28° C. Clear, slightly brown castings were obtained after 48 hours.

Example 9

A mixture of 27 parts of diallylidene pentaerythritol, 25 parts of maleic acid bis-(ethylene glycol) ester, 5 parts of diethylene glycol and 0.24 part boron trifluoride etherate were heated for 6 hours to 70° C.

Fifty parts of the clear, almost colorless resin dissolved in 30 parts styrene, after mixing therewith 1.5 parts of cyclohexanone peroxide (50%) and 0.7 part of a cobalt octoate solution, hardened into glass-clear, colorless formed bodies.

Example 10

Fifty-three (53) parts of diallylidene pentaerythritol were thoroughly mixed with 51 parts of maleic acid bis-(ethylene glycol) ester and 0.2 part boron trifluoride and heated for 1 hour to 110° C. Sixty (60) parts of the brown resin so obtained were dissolved in 40 parts styrene and mixed with 2 parts methyl isobutyl ketone peroxide solution (80%) and with 1 part of a cobalt octoate solution.

The solution gelled within 30 minutes and hardened in 24 hours into glass-clear, slightly brown masses.

Example 11

Twenty-one (21) parts of diallylidene pentaerythritol, 22 parts itaconic acid bis(ethylene glycol) ester and 0.4 part boron trifluoride etherate were stirred for 3 hours at 60° C. The slightly brown resin so obtained was dissolved in 20 parts of styrene.

After the addition of 0.6 part of methyl ethyl ketone peroxide and 0.3 part of cobalt octoate solution, the mixture hardened into slightly brown, clear masses.

Example 12

Two tenths (0.2) part of boron trifluoride was stirred into a solution of 27 parts of diallylidene pentaerythritol in 25 parts of maleic acid bis-(ethylene glycol) ester and 5 parts diethylene glycol and the solution was subsequently heated for 8 hours to 60° C. Fifty parts of the resin formed was dissolved in 40 parts of styrene and mixed with 1 part methyl ethyl ketone peroxide and 0.5 part cobalt octoate solution.

Several glass fiber mats were soaked with this resin solution and then pressed together cold into a form. The casting removed from the form after 30 minutes hardened at room temperature in 48 hours into a hard, resistant plate.

Example 13

With the same resin solution disclosed in Example 12, a cotton fabric was soaked and pressed together cold in several layers. After 14 hours at a temperature of 30° C., hard, resistant plates were obtained.

Example 14

Twenty (20) parts of the resin solution disclosed in Example 12 were stirred with 20 parts of pulverulent silicon carbide and cast in forms. The mass solidifies in a few hours into a very hard, smooth formed body.

Example 15

Twenty-five (25) parts of maleic acid bis-(ethylene glycol) ester, 26 parts diallylidene pentaerythritol and 0.2 part of boron trifluoride etherate were stirred together and heated for 5 hours to 65° C. The viscous, slightly brown resin was dissolved in 20 parts of styrene and stirred with 3 parts of methyl ethyl ketone peroxide and with 1.5 parts of cobalt octoate solution.

The solution so obtained was painted on glass plates and polymerized within 20 hours at 30° C. into solid (or firm) lacquer films which could be polished.

Example 16

Fifty-three (53) parts of diallylidene pentaerythritol were dissolved in 51 parts of maleic acid bis-(ethylene glycol) ester, mixed with 0.4 part boron trifluoride etherate and heated at 60° C. for about 5 hours until the OH— number fell between 80 and 100.

(a) Upon the brown, clear and strongly viscous resin being dissolved in 40 parts commercial styrene, gelling took place at 20° C. after 3 to 4 hours and, at 60°, already after a few minutes.

(b) When the same, brown resin solution was mixed with 0.15 g. sodium methylate dissolved in 1.2 ml. methanol, the resin brightened up to a slightly yellow color tone. When it was then dissolved in 40 parts of commercial styrene, the solution so obtained remained stable for months and did not show any inclination to gel.

Example 17

Ninety-five (95) parts of maleic acid bis-(ethylene glycol) ester, 100 parts diallylidene pentaerythritol and 0.8 part p-toluol sulfonic acid were mixed together and heated for five hours to 60° C. Then to the strongly brown, viscous resin 0.41 part of morpholine was added whereby a brightening towards a light-brown occurred. After thorough mixing, the resin, together with 0.2 part of 3-isopropyl pyrocatechol as a polymerization stabilizer, were dissolved in 70 parts styrene. The solution so obtained was stable and after 8 months remained unchanged. Without the addition of the morpholine, in spite of the presence of the polymerization stabilizer, gelling occurred already after 10 to 14 hours. It will be observed all of the esters used as reactants in the preceding examples are monomolecular esters.

It will be understood that diallylidene pentaerythritol is a known compound and is considered to have the following formula:

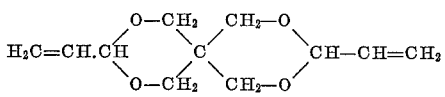

Those skilled in the art to which this invention appertains will recognize that the foregoing general disclosure and specific examples are merely exemplary and that the specified reactants, reaction conditions, and other process details may be varied widely and still fall within the spirit of the invention taught herein and within its scope as defined in the appended claims.

What is claimed is:

1. A process for producing a resin polymer which comprises (I) producing a resinous polyadduct having an OH— number not exceeding 100 by intimately admixing (A) a monomolecular ester of an α,β-ethylenically unsaturated dicarboxylic acid of not more than 5 carbon atoms with a saturated polyhydric alcohol having up to 10 carbon atoms, said ester containing free excess alcoholic hydroxy groups and (B) diallylidene pentaerythritol in molar ratios of between 0.5 and 2 mols of diallylidene pentaerythritol for every molar unit of dicarboxylic acid contained in said ester with (C) catalytic amounts of an acid catalyst, admixing the polyadduct with a polymerizable monomer having the group >C=CH$_2$ and containing from 3 to 14 carbon atoms and with a small stabilizing quantity of an alkaline-reacting compound and (II) copolymerizing the resulting admixture by the addition of an organic peroxide.

2. A stable readily hardenable liquid resin composition comprising a solution of a polyadduct resin having an OH— number not exceeding 100 in a normally liquid polymerizable monomer having the group $>C=CH_2$ and containing from 3 to 14 carbon atoms, said polyadduct resin being a reaction product of diallylidene pentaerythritol with a monomolecular ester of an $\alpha,\beta$-ethylenically unsaturated dicarboxylic acid of not more than 5 carbon atoms with a saturated polyhydric alcohol having up to 10 carbon atoms which ester contains free excess alcoholic hydroxy groups and said solution being stabilized with a small but stabilizing amount of an alkaline-reacting compound, the diallylidene pentaerythritol being applied in an amount of 0.5 to 2 mols for every molar unit of dicarboxylic acid contained in said ester.

3. A resin polymer comprising the copolymer of (I) a resinous polyadduct having an OH— number not exceeding 100 obtained by intimately admixing (A) a monomolecular ester of an $\alpha,\beta$-ethylenically unsaturated dicarboxylic acid of not more than 5 carbon atoms with a saturated polyhydric alcohol having up to 10 carbon atoms, said ester containing free excess alcoholic hydroxy groups and (B) diallylidene pentaerythritol in a ratio of between 0.5 and 2 mols of diallylidene pentaerythritol for every molar unit of dicarboxylic acid contained in said ester with (C) catalytic amounts of an acid catalyst with (II) a polymerizable monomer having the group $>C=CH_2$ and containing from 3 to 14 carbon atoms, said copolymer being obtained by first mixing (I) and (II) with a small stabilizing amount of an alkaline-reacting compound and then inducing copolymerization of (I) and (II) by the addition of an organic peroxide.

4. The process of claim 1, in which (A) contains in intimate admixture therewith a lesser proportion by weight of a polyhydric compound in which the OH groups are the only functional groups and in which the polyhydric compound is selected from the group consisting of polyhydric alcohols, polynuclear diphenols, and dihydroxy-ethyl ethers of polynuclear diphenols.

5. The process of claim 1, wherein the catalyst is boron trifluoride etherate.

6. The stable readily hardenable liquid resin composition as claimed in claim 2, wherein the monomolecular ester thereof is derived from a polyhydric alkanol ether.

7. The stable readily hardenable liquid resin composition as claimed in claim 2, wherein the monomolecular ester thereof is derived from a polyhydric alkanol.

8. The stable readily hardenable liquid resin composition as claimed in claim 2, wherein the monomolecular ester thereof from which the polyadduct is obtained, contains in intimate admixture therewith a lesser proportion by weight of a polyhydric compound in which the OH groups are the only functional groups and in which the polyhydric compound is selected from the group consisting of polyhydric alcohols, polynuclear diphenols, and dihydroxyethyl ethyl ethers of polynuclear diphenols.

9. The stable readily hardenable liquid resin composition as claimed in claim 2, wherein the monomolecular ester thereof is maleic acid bis-(ethylene glycol) ester.

10. The stable readily hardenable liquid resin composition as claimed in claim 2, wherein the monomolecular ester thereof is itaconic acid bis-(ethylene glycol) ester.

11. The stable readily hardenable liquid resin composition as claimed in claim 2, wherein the monomolecular ester thereof is maleic acid bis-glycerol ester.

12. The stable readily hardenable liquid resin composition as claimed in claim 2, wherein the monomolecular ester thereof is the diester of maleic acid with trimethylol propane.

References Cited by the Examiner

UNITED STATES PATENTS

| | | | |
|---|---|---|---|
| 2,870,121 | 1/59 | Kraft | 260—67 |
| 2,902,476 | 9/59 | Kern et al. | 260—67 |
| 2,917,484 | 12/59 | Kray et al. | 260—67 |
| 2,974,116 | 3/61 | Parker et al. | 260—861 |
| 3,042,630 | 7/62 | Ropp | 260—67 |

FOREIGN PATENTS

| | | |
|---|---|---|
| 855,165 | 11/52 | Germany. |
| 529,338 | 6/55 | Italy. |

WILIAM H. SHORT, *Primary Examiner.*

D. ARNOLD, *Examiner.*